US010070383B2

(12) United States Patent
Fwu et al.

(10) Patent No.: US 10,070,383 B2
(45) Date of Patent: Sep. 4, 2018

(54) IMPROVING CARRIER AGGREGATION PERFORMANCE

(75) Inventors: Jong-Kae Fwu, Sunnyvale, CA (US); Huaning Niu, Milpitas, CA (US); Yujian Zhang, Beijing (CN); Yuan Zhu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 1193 days.

(21) Appl. No.: 13/997,219

(22) PCT Filed: Apr. 11, 2012

(86) PCT No.: PCT/US2012/033000
§ 371 (c)(1),
(2), (4) Date: Apr. 14, 2014

(87) PCT Pub. No.: WO2013/048569
PCT Pub. Date: Apr. 4, 2013

(65) Prior Publication Data
US 2015/0223265 A1 Aug. 6, 2015

Related U.S. Application Data

(60) Provisional application No. 61/542,086, filed on Sep. 30, 2011.

(51) Int. Cl.
*H04W 4/00* (2018.01)
*H04W 52/02* (2009.01)
(Continued)

(52) U.S. Cl.
CPC ........ *H04W 52/0222* (2013.01); *H04B 7/024* (2013.01); *H04B 7/0417* (2013.01);
(Continued)

(58) Field of Classification Search
None
See application file for complete search history.

(56) References Cited

U.S. PATENT DOCUMENTS

2010/0227569 A1* 9/2010 Bala .................. H04L 5/0007
455/73
2010/0238888 A1 9/2010 Sampath et al.
(Continued)

FOREIGN PATENT DOCUMENTS

CN 101867457 A 10/2010
CN 102065549 A 5/2011
(Continued)

OTHER PUBLICATIONS

CMCC, "Some Considerations on Interference from Multiple Macros to Pico", 3GPP TSG-RAN WG3 R3-110117, Jan. 2011, Meeting 70bis, Agenda 19, 2 pages, Dublin, Ireland.
(Continued)

*Primary Examiner* — Rebecca E Song
(74) *Attorney, Agent, or Firm* — Thorpe North & Western

(57) ABSTRACT

A system and method for using carrier aggregation and enhanced inter-cell interference coordination in carrier scheduling is disclosed. The method comprises scheduling a communication of control channel information from at least one low power node on a physical downlink control channel (PDCCH) over at least one of a first low power component carrier and a second low power component carrier. A sub-frame having a lowest level of interference caused by a corresponding macro component carrier is identified at each corresponding subframe of the component carriers. The identified sub-frame is selected to transmit the control channel information on the PDCCH from the at least one low power node to a mobile wireless device.

19 Claims, 8 Drawing Sheets

(51) Int. Cl.
| | |
|---|---|
| *H04W 48/16* | (2009.01) |
| *H04B 7/06* | (2006.01) |
| *H04B 7/0456* | (2017.01) |
| *H04L 12/891* | (2013.01) |
| *H04W 52/04* | (2009.01) |
| *H04L 5/00* | (2006.01) |
| *H04W 72/04* | (2009.01) |
| *H04W 4/08* | (2009.01) |
| *H04W 36/00* | (2009.01) |
| *H04W 4/06* | (2009.01) |
| *H04W 72/00* | (2009.01) |
| *H04W 72/12* | (2009.01) |
| *H04L 12/709* | (2013.01) |
| *H04W 48/18* | (2009.01) |
| *H04W 72/08* | (2009.01) |
| *H04B 7/024* | (2017.01) |
| *H04B 7/0417* | (2017.01) |
| *H04W 52/14* | (2009.01) |
| *H04W 76/34* | (2018.01) |
| *H04W 84/04* | (2009.01) |
| *H04W 52/54* | (2009.01) |
| *H04L 12/18* | (2006.01) |
| *H04L 25/02* | (2006.01) |
| *H04W 28/10* | (2009.01) |
| *H04W 52/24* | (2009.01) |
| *H04W 52/36* | (2009.01) |
| *H04W 48/12* | (2009.01) |

(52) U.S. Cl.
CPC ......... *H04B 7/0456* (2013.01); *H04B 7/0615* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 36/0005* (2013.01); *H04W 48/16* (2013.01); *H04W 48/18* (2013.01); *H04W 52/0235* (2013.01); *H04W 52/04* (2013.01); *H04W 52/146* (2013.01); *H04W 72/005* (2013.01); *H04W 72/042* (2013.01); *H04W 72/0446* (2013.01); *H04W 72/082* (2013.01); *H04W 72/1215* (2013.01); *H04W 72/1278* (2013.01); *H04W 72/1294* (2013.01); *H04W 76/34* (2018.02); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/23* (2018.01); *Y02D 70/24* (2018.01); *Y02D 70/444* (2018.01)

(56) References Cited

U.S. PATENT DOCUMENTS

| | | | |
|---|---|---|---|
| 2010/0254329 | A1* | 10/2010 | Pan .................. H04L 5/001 370/329 |
| 2011/0080896 | A1 | 4/2011 | Krishnamurthy et al. |
| 2012/0320854 | A1 | 12/2012 | Sumasu et al. |
| 2013/0064190 | A1* | 3/2013 | Hariharan ............ H04L 5/0053 370/329 |

FOREIGN PATENT DOCUMENTS

| | | |
|---|---|---|
| CN | 102158978 A | 8/2011 |
| WO | WO 2011/093093 A1 | 8/2011 |
| WO | 2013/048569 A1 | 4/2013 |

OTHER PUBLICATIONS

Qualcomm Incorprated, "On Reporting Usable Protected Resource in Resource Status Update Message", 3GPP TSG-RAN WG3 R3-110734, Feb. 2011, Meeting 71, Agenda 19, 2 pages, Taipei, Taiwan.

NEC Group, "DL Control channel enhancements with carrier aggregation solutions", 3GPP TSG-RAN WG1 # 66, R1-112137, Aug. 22-26, 2011, pp. 1-6.

Motorola, "Discussion of time domain eICIC scheme for Rel-10", 3GPP TSG RAN WG1 Meeting # 62 bis, R1-105622, Xi'an, China, Oct. 11-15, 2010, 6 pages.

Huawei, "Analysis on the eICIC schemes for the control channels in HetNet", 3GPP TSG RAN WG1 meeting # 61 bis, R1-103458, Dresden, Germany, Jun. 28-Jul. 2, 2010, 7 pages.

International Search Report and Written Opinion received for PCT application No. PCT/US2012/033000, dated Oct. 29, 2012, 10 pages.

* cited by examiner

IMPROVING CARRIER AGGREGATION PERFORMANCE

BACKGROUND

Global wireless data traffic is growing at an exponential rate. The amount of wireless data that is communicated is expected to increase by more than 25 times between 2010 and 2015. Wide area wireless networks have traditionally been constructed using relatively large, powerful base stations to cover a large area of users. The coverage area of each base station is commonly called a cell. In order to accommodate the increasing amounts of wireless data, wireless network providers are overlaying the traditional network of cells with an array of smaller, lower power base stations that can operate in conjunction with the base station in each cell. The closer proximity of the lower power base stations to users allows more users in a selected area to communicate wirelessly, thereby increasing the number of users that can operate within a cell.

The use of the low power base stations, referred to as low power nodes, in conjunction with the larger base stations, referred to as macro nodes, has complicated the ability of user devices to wirelessly communicate. The low power nodes often communicate in the same frequency, time, and/or space as the macro nodes. User devices that communicate with low power nodes often receive high levels of interference from the higher powered macro node. This interference can reduce the data rates of user devices operating in the cell, especially near the macro node.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

The use of low power nodes within a macro node cell can increase the number of wireless devices. However, the low power nodes can also cause interference at the wireless devices. This can be especially true at the edge of the area in which a low power node is designed to operate. The signal from the macro node may be stronger than the signal of the low power node, effectively drowning out the signal that the wireless device is configured to receive.

To reduce the interference at wireless devise caused by the macro node and the low power node, enhanced inter-cell interference coordination (eICIC) has been developed. Examples of the coordination provided by eICIC are provided in the third generation partnership project (3GPP) Long Term Evolution (LTE) specifications. Releases of the 3GPP standard include the 3GPP LTE, Release 8 in the fourth quarter of 2008 and 3GPP LTE Advanced Release 10 in the first quarter of 2011.

Figure 1:
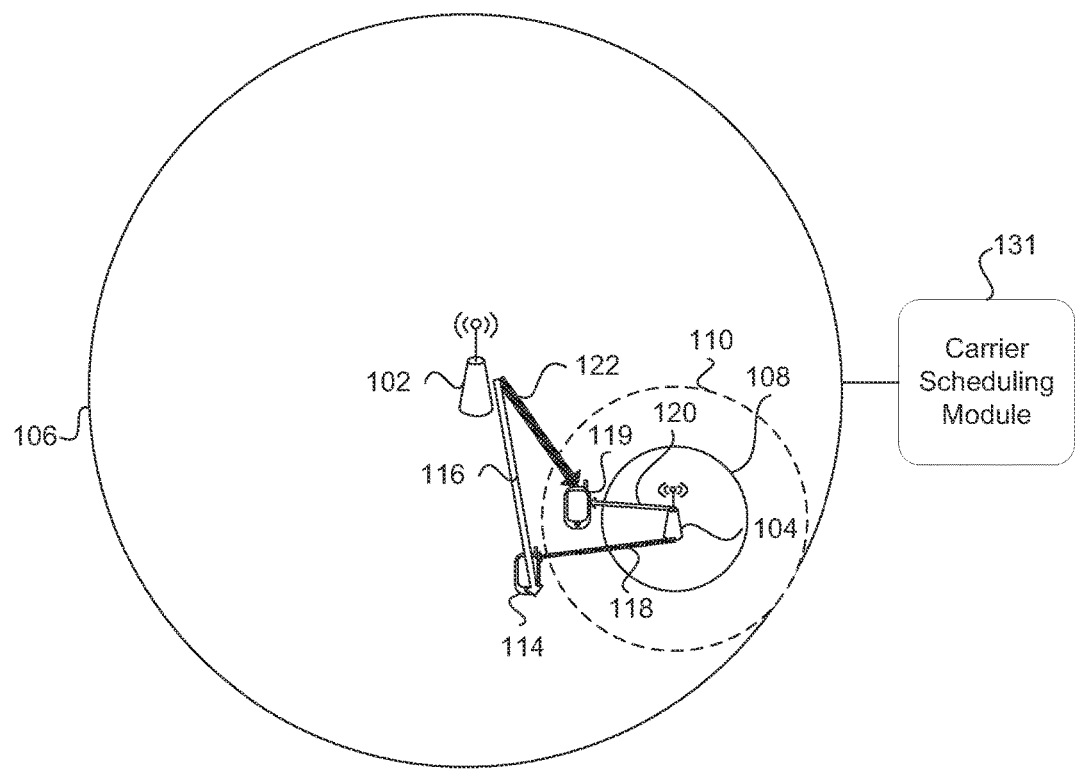
FIG. 1 illustrates a block diagram of the use of enhanced inter-cell interference coordination with a macro node and a pico node in accordance with an example.
Figure 1:
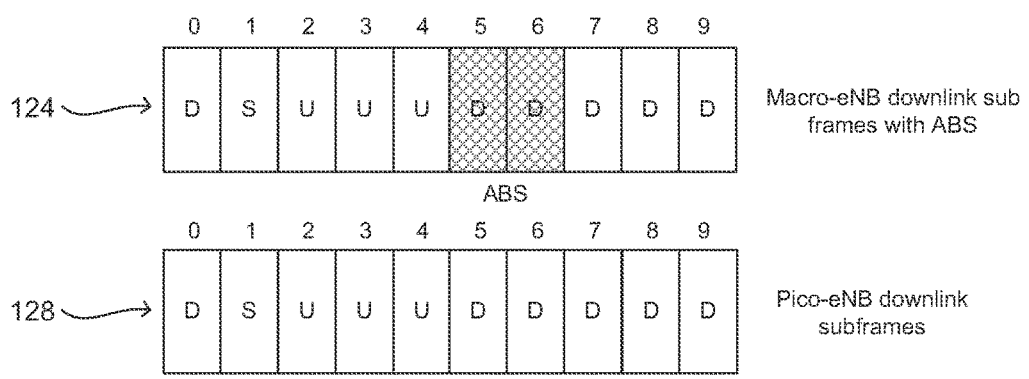

FIG. 1 illustrates an example of a macro node 102 and a low power node 104. In this example, the macro node is illustrated as an enhanced Node B (eNodeB) in accordance with the 3GPP LTE specifications Rel 8/9/10. However, the macro node may also operate based on other cellular type standards as well, as can be appreciated. The cell associated with the macro node ("macro cell) is typically configured to cover a large area (cell size), with a cell radius of 500 meters to more than a kilometer. The antennas on a macro node are typically elevated and transmit at a power of 20 watts or more.

The low power node in the example is a pico node, or more particularly, a pico eNodeB (eNB). Pico cells can be deployed by the wireless service providers to complement the service offered through the macro node. The pico node has a lower transmission power, typically an order of magnitude lower than the macro node. The pico node may be installed to provide access to a selected location to provide additional service in a high density location, such as an urban area, a university, a sporting arena, a mall, and so forth. A pico cell may also be installed in a selected location within a cell if the macro node's radiation pattern results in a low power area which can result in low speed connections or even dropped connections.

Other types of low power cells are referred to as femto cells, which are also called Home eNodeBs (HeNBs). HeNBs are lower power cells that are typically installed indoors. The HeNB may be installed by an end-user. A "closed-access" HeNB is configured to provide a Closed Subscriber Group (CSG), where wireless access via the HeNB or femto cell is provided only to subscribed users that are members of the CSG. An "open-access" HeNB can provide access to all UEs. A hybrid access HeNB may allow limited access to non-subscribed UEs, while providing a higher quality of service to users listed in the CSG.

The term "low power node", as used herein, can include nodes that are lower power than a typical macro node, including but not limited to micro nodes, pico nodes, femto nodes, HeNBs, and other nodes such as relay nodes.

Returning to FIG. 1, the pico-eNB 104 is shown having a first cell size 108 and an extended cell size 110. The macro-eNB 102 may instruct the pico-eNB to provide an extended range when the macro-eNB is over-extended. By increasing the range of each pico-eNB, additional wireless devices within the macro cell 106 can be serviced by the pico-eNB(s). However, by extending the range of the pico-eNB, the interference problems with the macro-eNB can become even more severe. For instance, when a wireless device is located further from the pico eNB and closer to the macro eNB, the signal from the pico-eNB becomes lower power, while the signal from the macro-eNB may be higher power, thereby causing more interference at a wireless device configured to receive the signal from the pico-eNB.

Figure 2:
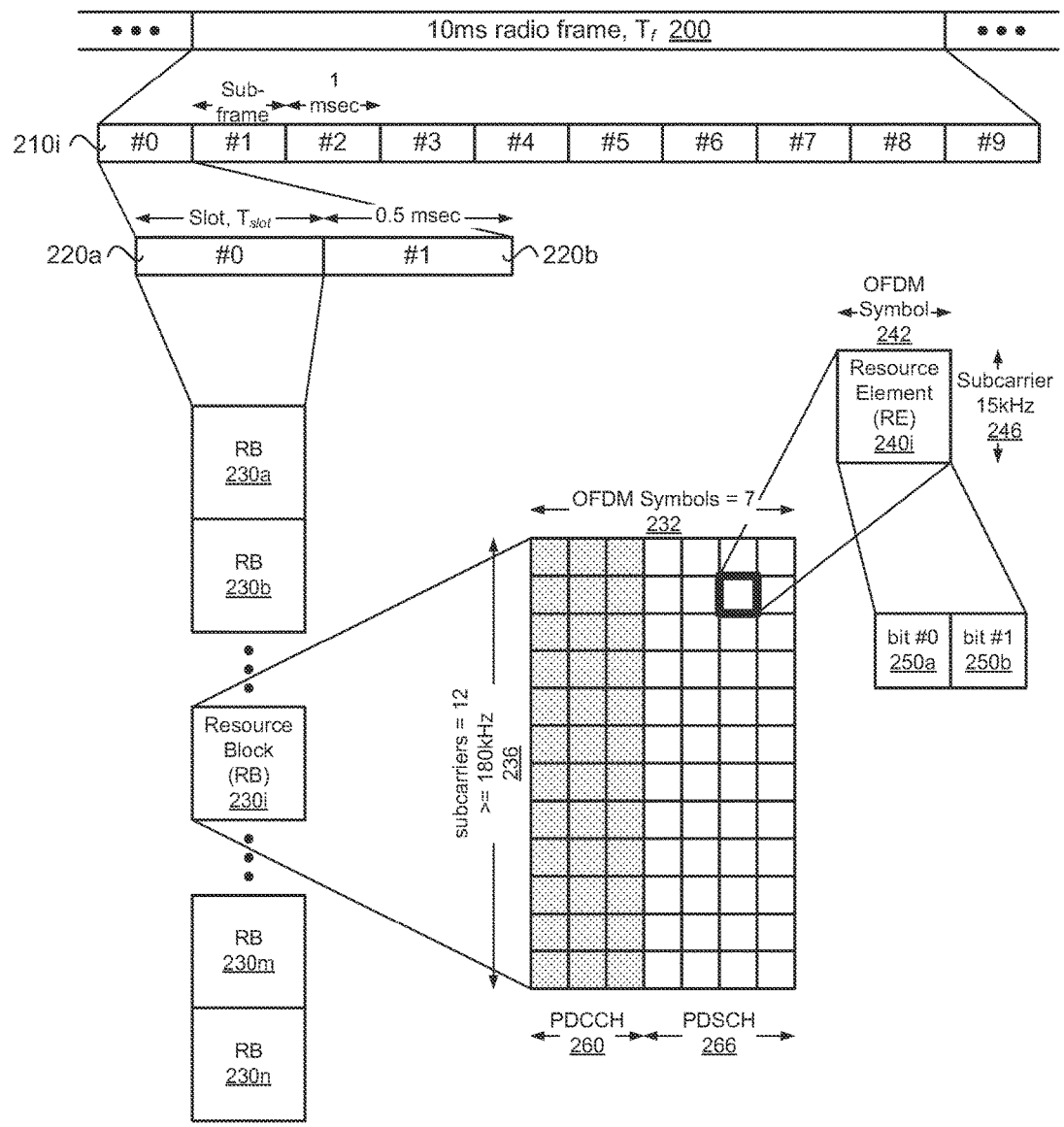
FIG. 2 illustrates a block diagram of an LTE radio frame in accordance with an example in accordance with an example.

In the 3GPP LTE architecture, communication between a wireless device and a macro node or low power node can be accomplished based on a frame structure, as outlined in the 3GPP LTE specification, Rel 8/9/10. FIG. 2 illustrates one example of an LTE downlink radio frame structure. In the example, a radio frame 200 of a signal used to transmit the data can be configured to have a duration, $T_f$, of 10 milliseconds (ms). Each radio frame can be segmented or divided into ten subframes 210i that are each 1 ms long. Each subframe can be further subdivided into two slots 220a and 220b, each with a duration, $T_{slot}$, of 0.5 ms. The first slot (#0) 220a can include a physical downlink control channel (PDCCH) 260 and/or a physical downlink shared channel (PDSCH) 266, and the second slot (#1) 220b can include data using the PDSCH. Each slot for a component carrier (CC) used by the transmitting station and the receiving station can include multiple resource blocks (RBs) 230a, 230b, 230i, 230m, and 230n based on the CC frequency bandwidth.

The CC can have a carrier frequency having a bandwidth and center frequency. Each RB (physical RB or PRB) 230i can include 12-15 kHz subcarriers 236 (on the frequency axis) and 6 or 7 orthogonal frequency-division multiplexing (OFDM) symbols 232 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 240i using short or normal cyclic prefixing, or the resource block can be mapped to 72 REs (not shown) using extended cyclic prefixing. The RE can be a unit of one OFDM symbol 242 by one subcarrier (i.e., 15 kHz) 246. Each RE can transmit two bits 250a and 250b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Reference signals can be transmitted by OFDM symbols via resource elements in the resource blocks. Reference signals (or pilot signals or tones) can be known signals used for various reasons, such as to estimate a channel and/or noise in the channel. Reference signals can be received and transmitted by transmitting stations (or nodes) and mobile devices. Different types of reference signals (RS) can be used in an RB. For example, in LTE systems, downlink reference signal types can include a cell-specific reference signal (CRS), a multicast\broadcast single-frequency network (MBSFN) reference signal, a UE-specific reference signal (UE-specific RS or UE-RS) or a demodulation reference signal (DMRS), positioning reference signal (PRS), and a channel-state information reference signal (CSI-RS).

Returning to FIG. 1, to accommodate the use of low power nodes, such as a pico-eNB 104 within the macro cell 106, the development of eICIC has provided coordination between the transmission from the macro eNB 102 and transmission from the pico eNB to reduce interference.

One aspect of the coordination has been through the use of protected subframes. Subframes (in the LTE frame structure) can be protected by reducing transmission activity by a macro node (i.e. macro eNB 102) in certain subframes. The macro node may reduce its transmission power of some downlink signals, or mute their transmission during a set of light macro interference subframes, referred to as almost blank subframes (ABS). In ABS, the macro node does not transmit data (PDSCH) or control channel information (PDCCH) in the protected subframe. Only reference signal information is included within the ABS. The reference signal information may be transmitted by the macro node at a reduced power level relative to transmission during non-ABS subframes.

The location of these ABS sub-frames is known a priori at the low power node(s) in the macro node's cell area. The low power node can then use the ABS sub-frames to transmit important information more efficiently, such as control channel information (PDCCH) to UE's in communication with the low power node. The ability to transmit control channel information during a relatively low-interference period can significantly enhance the ability of a wireless device to communicate with the low power node.

In FIG. 1, a first wireless device in communication with the macro-eNB 102, is referred to as a macro user equipment (MUE) 114. The MUE may receive a downlink component carrier signal from the macro-eNB 102 and an interference signal 118 from the pico-eNB. Similarly, a wireless device in communication with the pico-eNB 104 is referred to as a pico user equipment (PUE) 119. The PUE can receive a downlink component carrier signal 120 from the pico-eNB. Interference from the macro-eNB's downlink signal is represented as an interference signal 122 from the macro-eNB. Information can be communicated on each downlink component carrier from the macro-eNB and pico-eNB to the MUE and PUE, respectively, including control channel information on a PDCCH, data on a PDSCH, reference signals, and so forth.

In the example of FIG. 1, the macro-eNB 102 can be configured to include ABS during sub-frames 5 and 6 of the macro-eNB downlink subframes 124. During ABS, the macro-eNB, referred to as the aggressor node or aggressor cell, does not transmit the PDSCH and PDCCH. However, reference signals such as CRS, critical control channels such as the primary synchronization signal (PSS) and secondary synchronization signal (SSS), and broadcast and paging information may still be communicated. The pico-eNB 104, referred to as the victim node, can then communicate with its UEs in sub-frames that overlap with the aggressor node's ABS transmissions, such as frames 5 and 6 of the pico-eNB's subframes 128. Communication by the pico eNB during the ABS frames 5 and 6 can protect the UEs' in communication with the pico-eNB from strong inter-cell interference, thereby increasing the probability of successful PDCCH/PDSCH communication.

It is noted in subframe illustrations in FIG. 1 that "D" refers to a downlink subframe in which a signal is communicated from a node (macro-eNB or pico-eNB) to a UE. The symbol "U" refers to an uplink subframe in which a signal is communicated from a UE to the node to which it is associated. The symbol "S" refers to special subframes in this example. The special subframes can comprise a downlink pilot time slot, a guard period, and an uplink pilot time slot. The ABS nodes typically occur during downlink nodes of a macro node so that the transmission from the macro node does not overwhelm a transmission from the low power node(s) within the cell.

In addition to providing multiple nodes within a cell to allow wireless service to be provided to an increased number of wireless devices, multiple nodes can also be used to provide additional bandwidth to the wireless devices. For instance, the MUE 114 and/or PUE 118 can be configured to simultaneously receive and transmit multiple component carrier signals. Each of these component carriers can be aggregated at the UE to provide additional bandwidth. This process is referred to as carrier aggregation. The component carriers used in carrier aggregation may be frequency contiguous or non-frequency contiguous. Each component carrier for a UE may have the same bandwidth or different bandwidths. A component carrier may belong to a licensed portion of the wireless spectrum or an unlicensed portion of the wireless spectrum. A UE may setup both licensed and unlicensed component carriers simultaneously in carrier aggregation. However, component carriers are typically licensed portions of the wireless spectrum. A licensed portion of the wireless spectrum is a selected section of bandwidth that is regulated by a government entity. Unlicensed wireless spectrum is a selected section of bandwidth that is not regulated, such as the 2.45 GHz region that is used for Institute of Electrical and Electronics Engineers (IEEE) 802.11 standard that is commonly referred to as Wi-Fi. Additional information on carrier aggregation can be obtained in copending U.S. patent application Ser. No. 12/975,725, titled "Configuring Component Carriers in Carrier Aggregation", filed on Dec. 22, 2010.

Figure 3:
FIG. 3 illustrates a block diagram of an almost blank subframe pattern in a cell having macro and pico carrier aggregation in accordance with an example.

FIG. 3 provides one example of a cell, such as the macro-cell 106 illustrated in FIG. 1, wherein a first UE, referred to in the example of FIG. 3 as a macro UE (MUE) is associated with a first macro component carrier (Macro C1) and a second Macro component carrier (Macro C2). The Macro C1 and Macro C2 carriers can be combined at the UE using carrier aggregation. A second UE, referred to in the example of FIG. 3 as a Pico UE (PUE), is associated with a first component carrier (Pico C1) and a second component carrier (Pico C2). The pico node and macro node communicate over the Pico C1 and Macro C1 component carriers in the same time and frequency such that communication on the Macro C1 can cause interference to PUEs associated with the Pico C1. Similarly, communication on the Macro C2 component carrier can cause interference to PUEs associated with the Pico C2.

Accordingly, based on the enhanced ICIC (eICIC) of 3GPP LTE Rel. 10, certain subframes of the macro component carriers are ABS. In this example, subframes 1 and 6 of Macro C1 are ABS and subframe 2 of Macro C2 is an ABS. Subframes 1 and 6 of the Pico C1 component carrier are described as subframes with "light macro interference". The term "light macro interference", as used herein, refers to interference at a wireless device such as a UE on the low power component carrier (i.e. Pico C1 in this example) that is caused by the transmission of an ABS by the macro node on the corresponding component carrier, such as Macro C1 in this example. Since the ABS may only contain reference symbols that are transmitted at a lower power than they are transmitted in non-ABS subframes, the interference caused by transmitting the ABS on the macro component carrier is referred to as light macro interference at the low power (pico) component carrier.

The scheduling of transmission on multiple component carriers in carrier aggregation can be accomplished in at least two ways. In one embodiment, each component carrier can include its own scheduling, such as the downlink control information (DCI) and uplink control information (UCI) communicated on the PDCCH The DCI and UCI are collectively referred to herein as "control channel information". Alternatively, one component carrier may be used to provide the control channel of two or more component carriers. For example, the Macro C1 component carrier may carry the control channel information for both the Macro C1 and Macro C2 component carriers. This is referred to as cross carrier scheduling.

When no cross carrier scheduling occurs in the example of FIG. 3 for an MUE, there is no issue for eICIC. However, when cross carrier scheduling occurs, wherein the Macro C1 carries the control channel information for Macro C1 and Macro C2, or when Macro C2 carries the control channel information for Macro C2 and Macro C1, then the two component carriers may not be used optimally based on the eICIC in the 3GPP LTE Rel. 10 standard. The eICIC in the Rel. 10 standard is configured only for single component carriers, not for multiple component carriers that can be aggregated together based on carrier aggregation.

For instance, the macro-eNB will not allocate PDCCH or PDSCH information to be transmitted in ABS. If Macro C1 is designated as a primary cell (PCell) and communicates with ABS on subframes 1 and 6, as shown in FIG. 3, then the corresponding subframes (1 and 6) in Macro C2 cannot be allocated to carry PDCCH or PDSCH information either based on the current standard. This can result in potential scheduling constraints at the macro-eNB. In addition, there can be peak throughput loss for the UE and possible system throughput loss.

When no cross carrier scheduling is performed by the PUE associated with the Pico C1 and Pico C2 component carriers in FIG. 3 then the PUE control channels in both of the Pico C1 and Pico C2 component carriers in FIG. 3 do not take advantage of the subframes with light macro interference. In other words, no priority is given to communicating the control channel information in a subframe having the lowest interference from the macro-eNB.

When there is cross carrier scheduling by a low power node, such as a pico-eNB, then control reliability can be reduced. For example, if the control channel information is communicated on component carrier Pico C1 (i.e. Pico C1 is designated as the PCell), for subframe 2 then the data transmission scheduled on Pico C2 has light macro interference due to the ABS on Macro C2. However, the PDCCH is transmitted on normal subframe 2 on component carrier Pico C1. The normal subframe can have relatively high levels of interference from Macro C1. Thus, the transmission of the control channel information via component carrier Pico C1 can reduce the control reliability.

In both scenarios, when cross carrier scheduling is used or is not used, it can be observed that the interference mitigation potential for the PUE using ABS in two or more different component carriers is not fully utilized.

Figure 4:
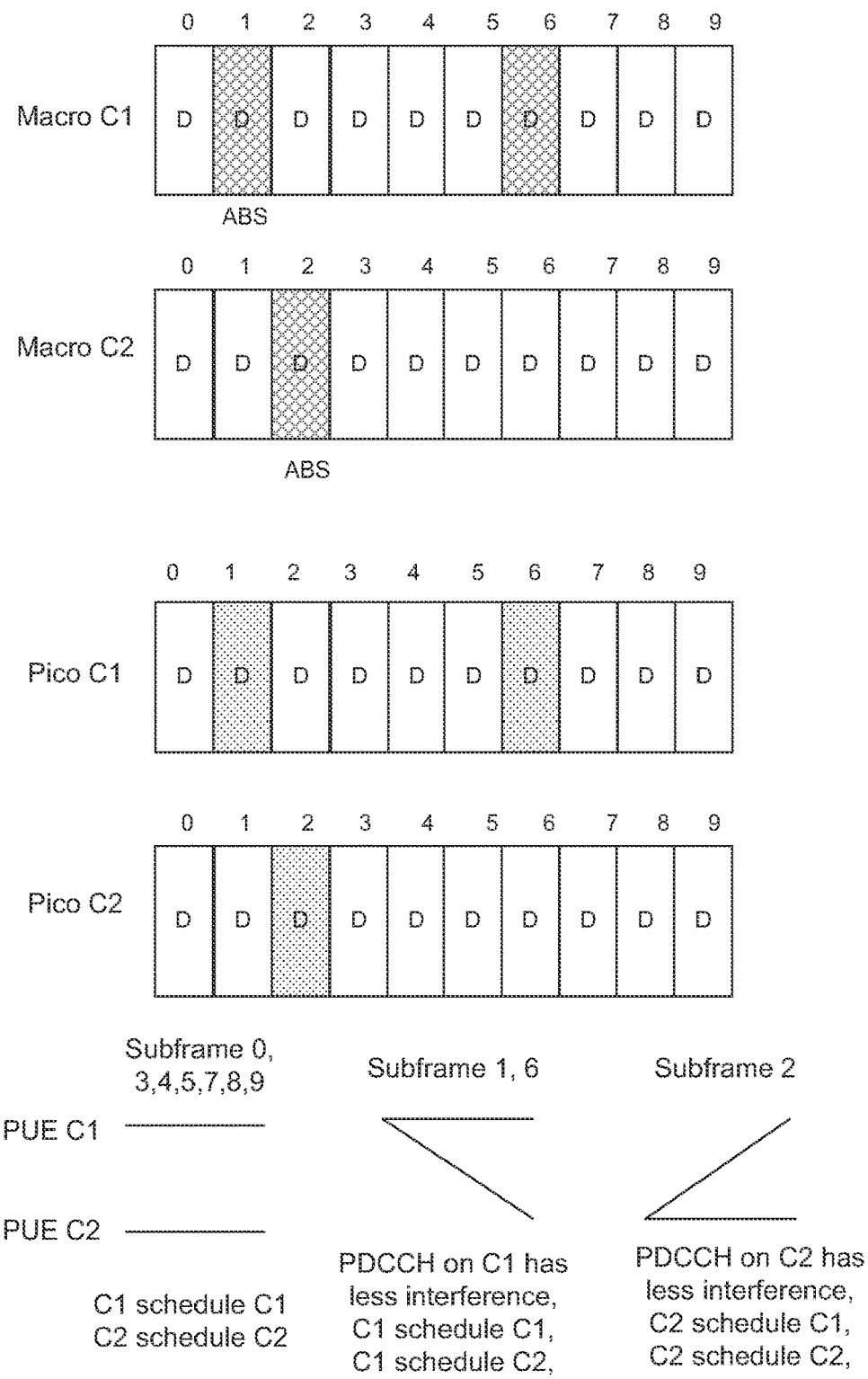
FIG. 4 illustrates a block diagram of using eICIC to allow cross carrier scheduling in a cell having macro and pico carrier aggregation in accordance with an example.

FIG. 4 provides an example in which carrier aggregation can be used to enhance the use of eICIC to improve PDCCH reliability. In the example of FIG. 4, no cross carrier scheduling is used. As previously discussed, when no cross carrier scheduling is used, carrier aggregation does not have an effect on an MUE.

FIG. 4 shows one example of how carrier aggregation can be used to improve the communication of control channel information using eICIC for a PUE. In this example, independent scheduling (i.e. no cross-carrier scheduling) can be used when there is no ABS on a corresponding macro component carrier. For example, in subframes 0, 3, 4, 5, 7, 8 and 9 then control channel information for the Pico C1 component carrier can be communicated on the Pico C1 component carrier, and control channel information for the Pico C2 component carrier can be communicated on the Pico C2 component carrier. However, when there is an ABS in a corresponding macro component carrier, then the corresponding subframes in the Pico component carrier that have light macro interference can be used to transmit control channel information via the PDCCH. For instance, FIG. 4 shows that in subframes 1 and 6 of component carrier Pico C1, there is light macro interference due to the ABS transmitted in subframes 1 and 6 of the corresponding component carrier Macro C1. Accordingly, control channel information for component carrier Pico C1 and component carrier Pico C2 can be transmitted on Pico C1 during subframes 1 and 6, since the lower level of interference will result in greater control reliability.

Similarly, in subframe 2, component carrier Pico C2 has light macro interference due to the ABS transmitted in subframe 2 of component carrier Macro C2. Accordingly, control channel information for component carrier Pico C2 and component carrier Pico C1 can be transmitted on Pico C2 during subframe 2, since the lower level of interference at subframe 2 on Pico C2 will result in greater control reliability. This concept can be extended to additional component carriers. For example, when there are N component carriers used in carrier aggregation, the component carrier having the lowest level of interference can be used to communicate the control channel information for each of the other N−1 component carriers.

A wireless device such as a UE can be configured to use carrier aggregation and monitor control channel information on only a single carrier. For instance, a UE may be configured for carrier aggregation that includes a component carrier designated as a primary cell (PCell) and at least one additional component carrier, each designated as a secondary cell (Scell). The UE may be configured to monitor the PDCCH for each component carrier on one of the carriers, such as the PCell. As previously discussed, monitoring the control channels for multiple carriers on a single carrier is referred to as cross carrier scheduling.

In accordance with one embodiment, eICIC can be used in conjunction with carrier aggregation when a wireless device monitors control channel information, such as a PDCCH on one component carrier of multiple component carriers. This can include, but is not limited to, embodiments employing cross carrier scheduling. For example, eICIC can enable control channel information to be communicated on the component carrier for a PUE that has less interference. In another example, eICIC can enable control channel information to be communicated on the component carrier for an MUE that does not include an ABS subframe. The ability to use eICIC to select between component carriers for communicating control channel information can significantly improve the PDCCH reliability. The increased PDCCH reliability can considerably improve system throughput of data in the PDSCH.

Figure 5:
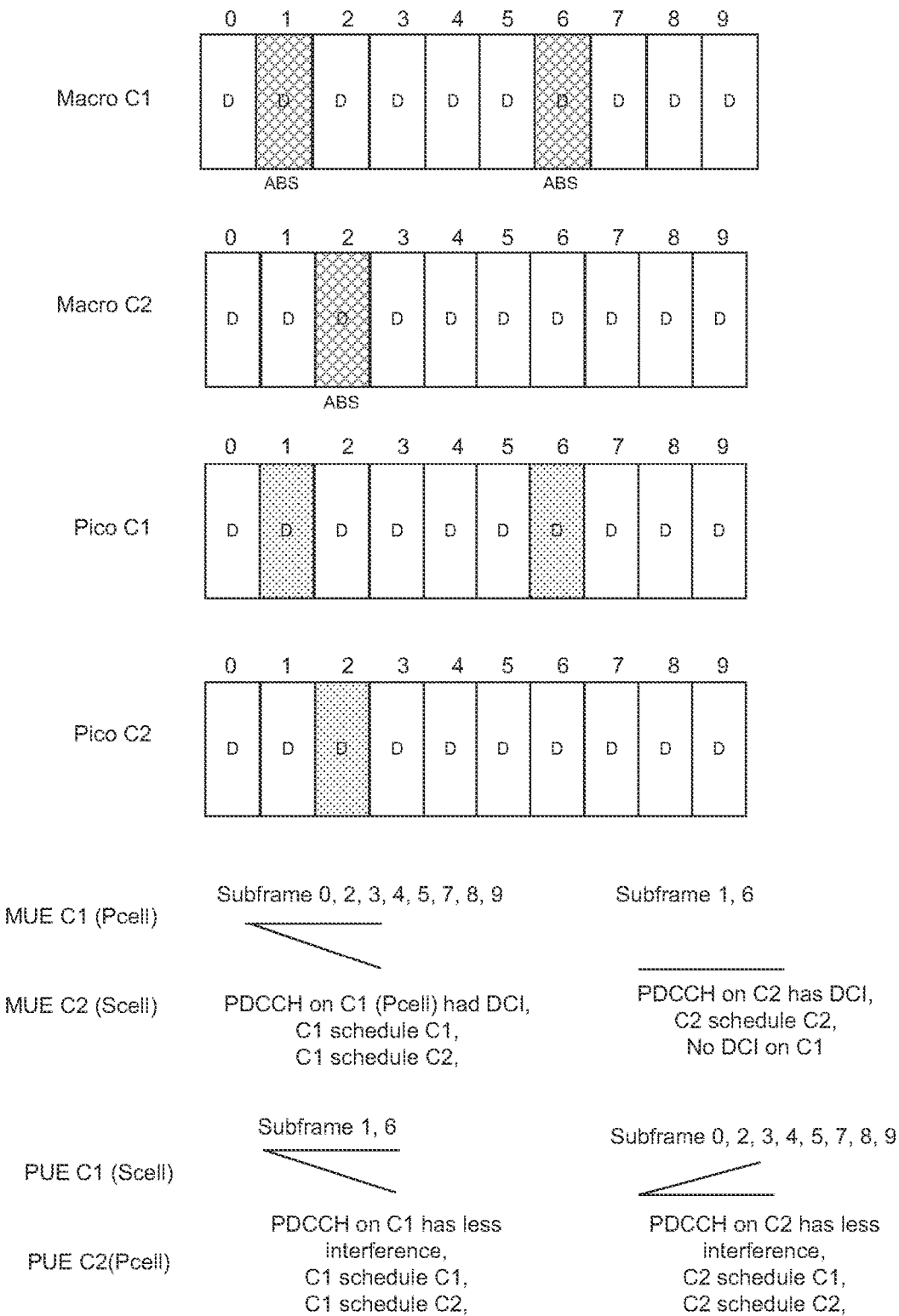
FIG. 5 illustrates a block diagram of using eICIC to select a lowest interference subframe for DCI communication in a cell having macro and pico carrier aggregation in accordance with an example.

In one example illustrated in FIG. 5, the Pico C2 component carrier can be designated as the PCell for a PUE. The PDCCH for the Pico C1 component carrier and the Pico C2 component carrier is typically transmitted on the PCell. In subframe 1 and 6, ABS is used in the Macro C1 component carrier, resulting in light interference subframes in the corresponding subframes in the Pico C1 component carrier. Since subframes 1 and 6 in the Pico C1 component carrier have lower interference than the corresponding subframes 1 and 6 in the Pico C2 component carrier, the PUE can be configured to switch the transmission of PDCCH from the Pico C2 component carrier (Pcell) to the Pico C1 component carrier (Scell) in frames 1 and 6 to take advantage of the lower interference subframes 1 and 6 and improve system throughput.

Since subframes 0, 2, 3, 4, 5, 7, 8 and 9 in the Pico C2 component carrier have less than or approximately equal levels of interference relative to the corresponding subframes in the Pico C1 component carrier, the Pico C2 component carrier can be used to communicate the control channel information, such as DCI and UCI, on the PDCCH of the Pico C2 component carrier (Pcell).

In the example of FIG. 5, the Macro C1 component carrier is designated as the PCell for an MUE. The control channel information, such as DCI and UCI, is normally transmitted on the Macro C1 component carrier. In subframes 0, 2, 3, 4, 5, 7, 8 and 9 the control channel information for all of the component carriers for the MUE can be communicated on the Macro C1 component carrier (Pcell).

However, subframes 1 and 6 of the Macro C1 component carrier are set to be ABS. Control channel information, such as DCI and UCI is not typically transmitted during ABS. Accordingly, the MUE can be configured to switch the transmission of PDCCH from the Macro C1 component carrier (Pcell) to the Macro C2 component carrier (Scell) in frames 1 and 6 to allow the transmission of control channel information such as DCI and UCI, thereby enabling resources to be scheduled that would not be scheduled due to the ABS subframes on the PCell.

To enable a UE to determine the component carrier on which control channel information (PDCCH) should be monitored, higher layer signaling can be used to communicate a PDCCH monitoring pattern. In one embodiment, the PDCCH monitoring pattern can be communicated during carrier aggregation configuration. The PDCCH monitoring pattern can be updated by higher layer signaling when there is a carrier aggregation configuration change, such as an SCell activation or deactivation, a PCell/SCell(s) handover, and so forth. The higher layer signaling may be radio resource control (RRC) signaling, or another desired type of signaling between a macro node/low power node and a UE. The term "higher layer" typically refers to signaling that is communicated using layer 4 or higher protocols, including, but not limited to RRC signaling, user datagram protocol (UDP) signaling, transmission control protocol (TCP) signaling, asynchronous transfer mode (ATM) signaling, and multiprotocol label switching (MPLS).

Figure 6:
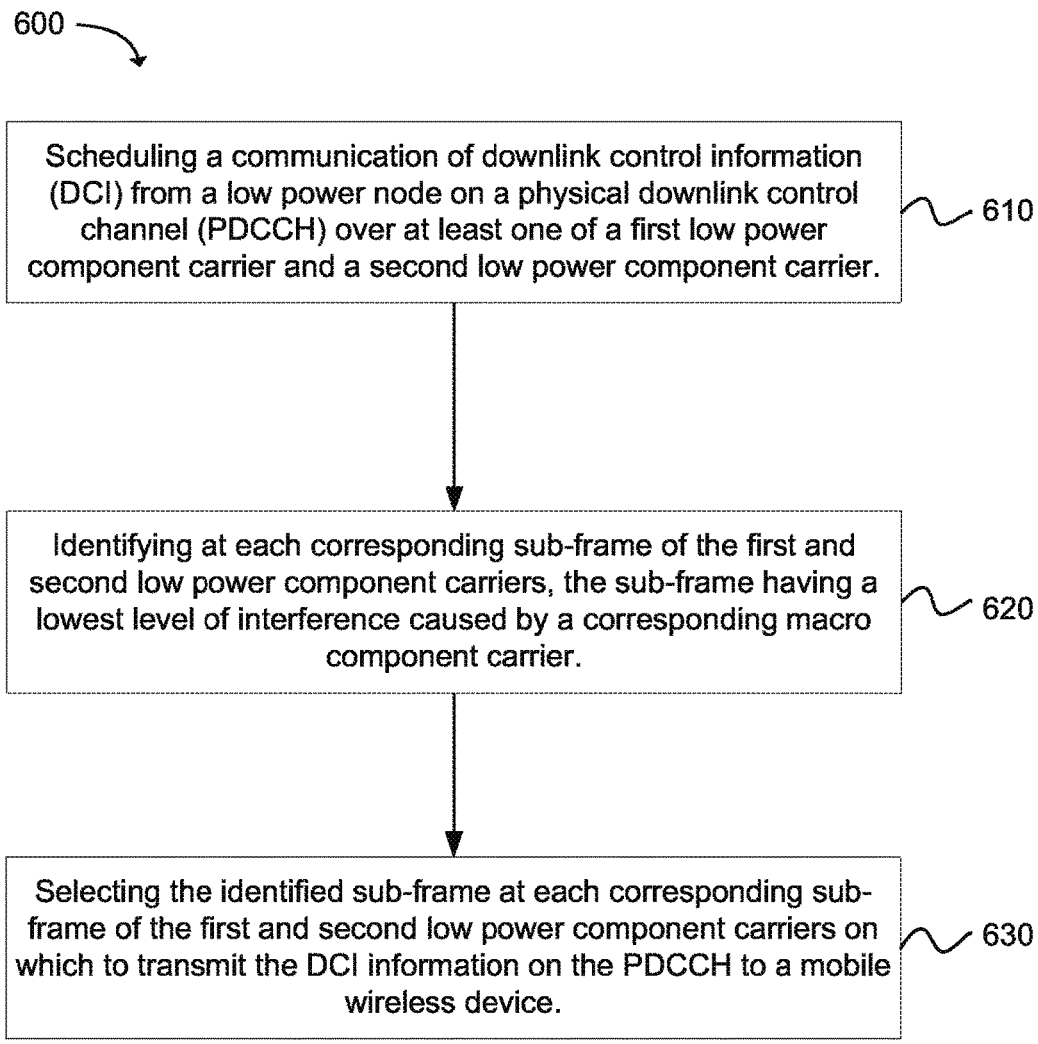
FIG. 6 depicts a flow chart of a method for carrier scheduling in accordance with an example.

In another embodiment, a method 600 for carrier scheduling is disclosed, as depicted in the flow chart of FIG. 6. The method includes the operation of scheduling a communication of control channel information from at least one low power node on a physical downlink control channel (PDCCH) over at least one of a first low power component carrier and a second low power component carrier, as shown in block 610. The control channel information can include both downlink control information (DCI) and uplink control information (UCI). Other types of control information may be included as well.

The method 600 further comprises identifying, at each corresponding sub-frame of the first and second low power component carriers, the sub-frame having a lowest level of interference caused by a corresponding macro component carrier, as shown in block 620. Block 630 depicts the operation of selecting the identified sub-frame at each corresponding sub-frame of the first and second low power component carriers on which to transmit the DCI information on the PDCCH to a mobile wireless device.

In one embodiment, the operation of identifying the sub-frame having a lowest level of interference further comprises: identifying when a sub-frame in one of the first and second low power component carriers is a light interference sub-frame that corresponds with an almost blank sub-frame of the corresponding macro component carrier; and selecting the light interference sub-frame to transmit the control channel information for both of the first low power component carrier and the second low power component carrier from the low power node via the PDCCH.

In another embodiment, the control channel information for the first low power component carrier can be transmitted on the first low power component carrier and the control channel information for the second low power component carrier can be transmitted on the second low power component carrier when a corresponding sub-frame of one of the first and second low power component carriers is not a light interference sub-frame that corresponds with an almost blank sub-frame of the corresponding macro component carrier.

The method 600 can further comprise the operations of: scheduling a communication of the control channel information from a macro node on a physical downlink control channel (PDCCH) over at least one of a first macro component carrier and a second macro component carrier; identifying at each corresponding sub-frame of the first and second macro component carriers, if the sub-frame is configured as an almost blank sub-frame (ABS); selecting one of the first and second macro component carriers as a primary cell (PCell); and transmitting, at each sub-frame, the control channel information for the first and second macro component carriers on the Pcell when the sub-frame on the PCell is not configured as an ABS.

In one embodiment, the control channel information for the first and second macro component carriers can be transmitted at each sub-frame on one of the first and second macro component carriers that is not selected as the PCell, when the sub-frame on the PCell is configured as an ABS.

In another embodiment, scheduling a communication of control channel information further comprises scheduling a communication of at least one of downlink control information (DCI) and uplink control information (UCI) on the PDCCH.

Figure 7:
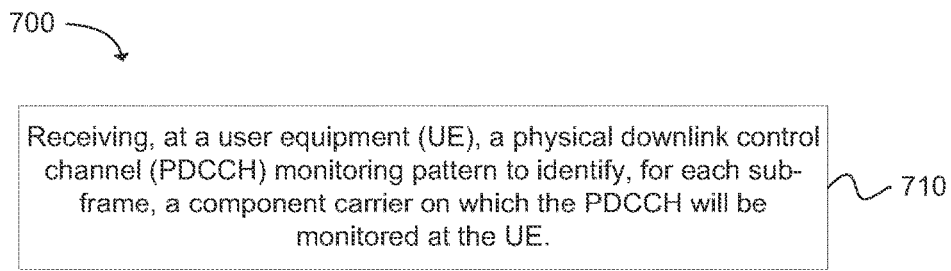
FIG. 7 depicts a flow chart of a method for carrier scheduling in accordance with another example.

In another embodiment, a method 700 for carrier scheduling is disclosed, as depicted in the flow chart of FIG. 7. The method comprises receiving, at a user equipment (UE), a physical downlink control channel (PDCCH) monitoring pattern to identify, for each sub-frame, a component carrier on which the PDCCH will be monitored at the UE, as shown in block 710.

The method can further comprise the operations of: receiving, at the UE, a first PDCCH monitoring pattern to identify, for each sub-frame, one of a first macro component carrier and a second macro component carrier, on which the PDCCH will be monitored at the UE; and receiving, at the UE, a second PDCCH monitoring pattern to identify, for each sub-frame, one of a first low power component carrier and a second low power component carrier, on which the PDCCH will be monitored at the UE.

In one embodiment, the method further comprises determining from the second PDCCH monitoring pattern, that the PDCCH will be monitored, at each corresponding sub-frame of the first and second low power component carriers, on the sub-frame having a lowest level of interference caused by a corresponding macro component carrier.

The method can also comprise the operation of determining from the second PDCCH monitoring pattern, when a sub-frame in one of the first and second low power component carriers is a light interference sub-frame that corresponds with an almost blank sub-frame of the corresponding component carrier, that the PDCCH will be monitored on the light interference sub-frame.

In another embodiment, the method comprises determining from the second PDCCH monitoring pattern, that the PDCCH for the first low power component carrier will be monitored on the first low power component carrier and the PDCCH for the second low power component carrier will be monitored on the second low power component carrier when a corresponding sub-frame of one of the first and second low power component carriers is not a light interference sub-frame that corresponds with an almost blank sub-frame of the corresponding macro component carrier.

The method can also comprise the operation of determining, from the first PDCCH monitoring pattern, at each sub-frame, that the macro component carrier designated as a primary cell (PCell) should be monitored for PDCCH when the PCell is not designated as an almost blank sub-frame (ABS). In addition, it can be determined, from the first PDCCH monitoring pattern, that the PDCCH shall be monitored on one of the first and second macro component carriers that is not selected as the PCell, when the sub-frame on the PCell is designated as an ABS.

In another embodiment, a wireless system using carrier aggregation and enhanced inter-cell interference coordination is disclosed. As illustrated in FIG. 1, the system can include a low power node 104 configured to communicate with a wireless device 119 via a first low power component carrier and a second low power component carrier using the carrier aggregation, wherein the first and second low power component carriers include light macro interference sub-frames associated with almost blank sub-frames in a first macro component carrier and a second macro component carrier, respectively.

The wireless system also includes a carrier scheduling module 131 configured to communicate with the low power node, wherein the carrier scheduling module is configured to schedule control channel information for the first low power component carrier for transmission on the second low power component carrier during light macro interference sub-frames of the second low power component carrier. The carrier scheduling module may be included in the low power node 104. Alternatively, the carrier scheduling module may be located elsewhere in the wireless network, and configured to communicate with the low power node.

In one embodiment of the system, the carrier scheduling module is configured to schedule PDCCH information for the first low power component carrier for transmission on the first low power component carrier when there are not light macro interference sub-frames on a corresponding sub-frame of the second low power component carrier.

In another embodiment of the system, the carrier scheduling module is configured to schedule PDCCH information for transmission to the wireless device on one of the first and second low power component carriers that has a lowest interference level.

In a further embodiment of the system, the carrier scheduling module is configured to schedule PDCCH information for transmission to the wireless device on one of the first and second macro component carrier sub-frames that does not have an almost blank sub-frame.

In another embodiment of the system, the carrier scheduling module is further configured to communicate an updated PDCCH monitoring pattern to the wireless device when a change in the carrier aggregation occurs.

Figure 8:
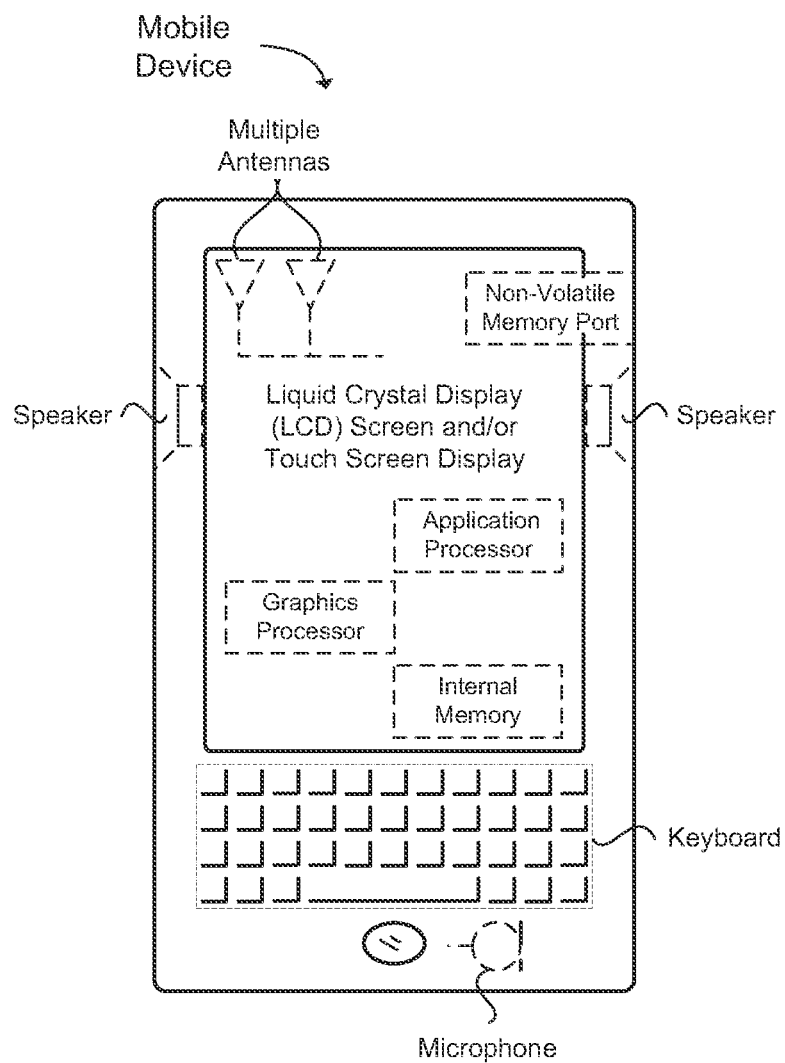
FIG. 8 illustrates a block diagram of a mobile device, in accordance with an example.

FIG. 8 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for carrier scheduling, comprising:
  scheduling a communication of control channel information from a low power node on a physical downlink control channel (PDCCH) over at least one of a first low power component carrier and a second low power component carrier;
  identifying at each corresponding sub-frame of the first and second low power component carriers, the sub-frame having a lowest level of interference caused by a corresponding macro component carrier; and
  selecting the identified sub-frame at each corresponding sub-frame of the first and second low power component carriers on which to transmit the control channel information on the PDCCH to a wireless device.

2. The method of claim 1, wherein identifying the sub-frame having a lowest level of interference further comprises:
  identifying when a sub-frame in one of the first and second low power component carriers is a light interference sub-frame that corresponds with an almost blank sub-frame of the corresponding macro component carrier; and
  selecting the light interference sub-frame to transmit the control channel information for both of the first low power component carrier and the second low power component carrier from the low power node via the PDCCH.

3. The method of claim 1, further comprising transmitting the control channel information for the first low power component carrier on the first low power component carrier and transmitting the control channel information for the second low power component carrier on the second low power component carrier when a corresponding sub-frame of one of the first and second low power component carriers is not a light interference sub-frame that corresponds with an almost blank sub-frame of the corresponding macro component carrier.

4. The method of claim 1, further comprising:
  scheduling a communication of the control channel information from a macro node on a physical downlink control channel (PDCCH) over at least one of a first macro component carrier and a second macro component carrier;
  identifying at each corresponding sub-frame of the first and second macro component carriers, if the sub-frame is configured as an almost blank sub-frame (ABS);
  selecting one of the first and second macro component carriers as a primary cell (PCell); and
  transmitting, at each sub-frame, the control channel information for the first and second macro component carriers on the Pcell when the sub-frame on the PCell is not configured as an ABS.

5. The method of claim 4, further comprising transmitting, at each sub-frame, the control channel information for the first and second macro component carriers on one of the first and second macro component carriers that is not selected as the PCell, when the sub-frame on the PCell is configured as an ABS.

6. The method of claim 1, wherein scheduling a communication of control channel information further comprises scheduling a communication of at least one of downlink control information (DCI) and uplink control information (UCI) on the PDCCH.

7. A wireless system using carrier aggregation and enhanced inter-cell interference coordination, comprising:
  a low power node configured to communicate with a wireless device via a first low power component carrier and a second low power component carrier using the carrier aggregation, wherein the first and second low power component carriers include light macro interference sub-frames associated with almost blank sub-frames in a first macro component carrier and a second macro component carrier, respectively;
  a cross carrier scheduling module configured to communicate with the low power node, wherein the cross carrier scheduling module is configured to schedule control channel information for the first low power component carrier for transmission on the second low power component carrier during light macro interference sub-frames of the second low power component carrier.

8. The system of claim 7, wherein the cross carrier scheduling module is configured to schedule physical downlink control channel (PDCCH) information for the first low power component carrier for transmission on the first low power component carrier when there are not light macro interference sub-frames on a corresponding sub-frame of the second low power component carrier.

9. The system of claim 7, wherein the cross carrier scheduling module is configured to schedule physical downlink control channel (PDCCH) information for transmission to the wireless device on one of the first and second low power component carriers that has a lowest interference level.

10. The system of claim 7, wherein the cross carrier scheduling module is configured to schedule physical downlink control channel (PDCCH) information for transmission to the wireless device on one of the first and second macro component carrier sub-frames that does not have an almost blank sub-frame.

11. The system of claim 7, wherein the cross carrier scheduling module is further configured to communicate an updated physical downlink control channel (PDCCH) monitoring pattern to the wireless device when a change in the carrier aggregation occurs.

12. The system of claim 7, wherein the cross carrier scheduling module is configured to schedule control channel information that is comprised of at least one of downlink control channel information and uplink control channel information.

13. A method for carrier scheduling, comprising:
receiving, at a user equipment (UE), a physical downlink control channel (PDCCH) monitoring pattern to identify, for each sub-frame, a component carrier on which the PDCCH will be monitored at the UE;
receiving, at the UE, a first PDCCH monitoring pattern to identify, for each sub-frame, one of a first macro component carrier and a second macro component carrier, on which the PDCCH will be monitored at the UE; and
receiving, at the UE, a second PDCCH monitoring pattern to identify, for each sub-frame, one of a first low power component carrier and a second low power component carrier, on which the PDCCH will be monitored at the UE.

14. The method of claim 13, further comprising determining from the second PDCCH monitoring pattern, that the PDCCH will be monitored, at each corresponding sub-frame of the first and second low power component carriers, on the sub-frame having a lowest level of interference caused by a corresponding macro component carrier.

15. The method of claim 13, further comprising determining from the second PDCCH monitoring pattern, when a sub-frame in one of the first and second low power component carriers is a light interference sub-frame that corresponds with an almost blank sub-frame of the corresponding component carrier, that the PDCCH will be monitored on the light interference sub-frame.

16. The method of claim 13, further comprising determining from the second PDCCH monitoring pattern, that the PDCCH for the first low power component carrier will be monitored on the first low power component carrier and the PDCCH for the second low power component carrier will be monitored on the second low power component carrier when a corresponding sub-frame of one of the first and second low power component carriers is not a light interference sub-frame that corresponds with an almost blank sub-frame of the corresponding macro component carrier.

17. The method of claim 13, further comprising determining, from the first PDCCH monitoring pattern, at each sub-frame, that the macro component carrier designated as a primary cell (PCell) should be monitored for PDCCH when the PCell is not designated as an almost blank sub-frame (ABS).

18. The method of claim 17, further comprising determining, from the first PDCCH monitoring pattern, that the PDCCH shall be monitored on one of the first and second macro component carriers that is not selected as the PCell, when the sub-frame on the PCell is designated as an ABS.

19. The method of claim 13, further comprising receiving the first and second PDCCH monitoring patterns at the UE via radio resource control (RRC) signaling.

* * * * *